United States Patent [19]

Shull et al.

[11] Patent Number: 4,893,314
[45] Date of Patent: Jan. 9, 1990

[54] PROTECTED INTERNAL LASER MIRROR ADJUSTING APPARATUS

[75] Inventors: William Shull, Aptos; Rudolf Nissen, Pescadero; Kim M. Gunther, Watsonville, all of Calif.

[73] Assignee: Spectra-Physics, Inc., San Jose, Calif.

[21] Appl. No.: 251,120

[22] Filed: Sep. 29, 1988

[51] Int. Cl.⁴ .............................................. H01S 3/08
[52] U.S. Cl. ..................................... 372/107; 372/65
[58] Field of Search .................. 372/107, 108, 61, 65, 372/98, 103

[56] References Cited

U.S. PATENT DOCUMENTS

| 4,064,466 | 12/1977 | Seki et al. | 372/107 |
| 4,309,669 | 1/1982 | Bloot et al. | 372/103 |
| 4,653,063 | 3/1987 | Acharekar et al. | 372/98 |
| 4,744,091 | 5/1988 | Gorisch et al. | 372/107 |

*Primary Examiner*—Léon Scott, Jr.
*Attorney, Agent, or Firm*—Lyon & Lyon

[57] ABSTRACT

A hollow mirror seat, insertable into the end of a laser tube, has a first portion having a first length and a first outside diameter close to the inside diameter of the laser tube. A second portion of the mirror seat has a second length and a second outside diameter smaller than the inside diameter of the laser tube. A portion of the second length has a region of reduced wall thickness around its entire circumference.

4 Claims, 2 Drawing Sheets

PROTECTED INTERNAL LASER MIRROR ADJUSTING APPARATUS

BACKGROUND OF THE INVENTION

1. Field Of The Invention

The present invention pertains to laser technology. More particularly, the present invention pertains to the adjusting mechanisms for laser cavity-forming mirrors.

2. The Prior Art

Laser systems employ mirrors for the purpose of defining the laser cavity. At some point in the laser manufacturing operation, the laser cavity is defined by adjusting the cavity-forming mirrors at the proper angle to facilitate lasing. In prior art laser systems known to the inventors, the adjustment of the cavity forming mirror in the laser tube is performed by means of an external member to which the mirror mount is connected. The external member is bent to an orientation which results in the mirror being properly oriented. For instance, in some prior art laser systems, the mirror is mounted on the end of a hollow stem extending from the end of the laser tube. The stem is hollow, providing for the beam path and may be deformed by bending to properly form the laser cavity. In addition, mirror mounts having deformable portions have been fastened to the end of a laser tube. See, e.g., U.S. Pat. No. 3,826,998 to Kindi et al.

While prior art mirror adjusting systems have proved to be adequate, there is room for improvement. One disadvantage which is present with respect to the prior art mirror adjusting arrangements is that, because they are externally mounted, they may easily be and often are misaligned by inadvertent touching by human hands or tools. In practice, such accidental misalignment has been known to cause significant problems. In addition, the fact that the mirrors in some of the prior art adjustment schemes are mounted on the end of a stem results in a relatively large bending radius. Therefore, a relatively large mirror is needed and the assembly is much more subject to mechanical vibration caused by the weight of the tubular housing and the small diameter of the stem.

BRIEF DESCRIPTION OF THE INVENTION

The protected internal laser mirror adjustment apparatus of the present invention is contained within the volume of the laser tube itself. A hollow mirror seat insertable into the end of the laser tube has a first portion having a first length and a first outside diameter compatible with the inside diameter of the laser tube. A second portion of the mirror seat has a second outside diameter smaller than that of the inside of the laser tube and has a second length. A means for deforming the position of the second length of the mirror seat is provided. In a preferred embodiment, a portion of the second length has a region of reduced wall thickness around its entire circumference. A mirror is attached to the end of the mirror seat by a glass frit or solder glass or other known methods, such as low temperature metallic sealing. The mirror seat is inserted into the end of the laser tube, second length portion first, so that the end of its first length portion is flush with the end of the laser tube, and the end of the mirror seat having the first diameter is welded to the end of the tube wall using an inert gas heliarc weld or similar process.

DETAILED DESCRIPTION OF A PREFERRED EMBODIMENT

Figure 1:
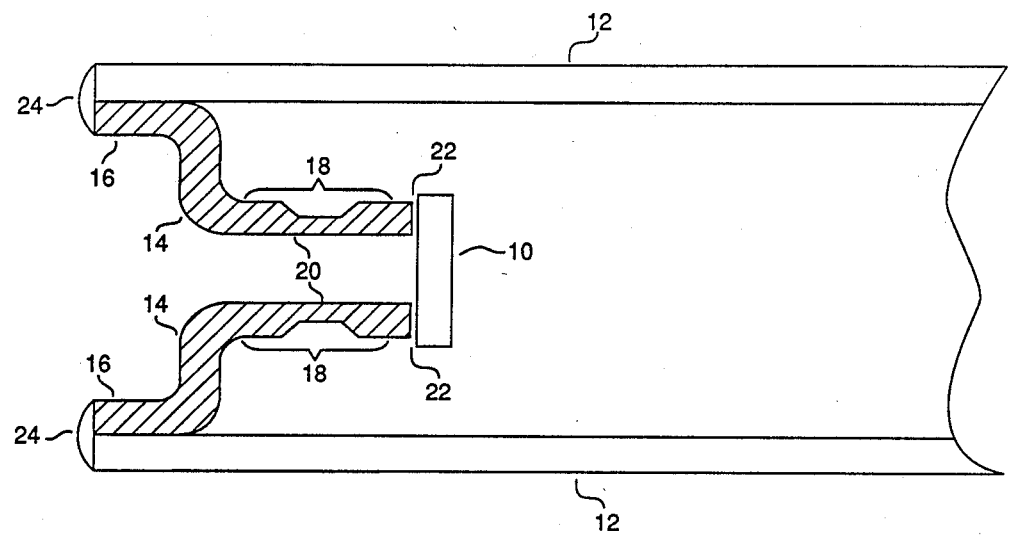
FIG. 1 is a cross-sectional view of a laser tube containing the protected internal laser mirror adjustment mechanism of the present invention and a laser mirror.

Referring to FIG. 1, laser cavity-forming mirror 10 is shown mounted inside a laser tube having walls 12 by means of hollow mirror seat 14. A first length 16 of mirror seat 14 has an outside diameter closely matched to the inside diameter of the laser tube defined by tube walls 12. "Closely matched" means that the outside diameter of the first length will fit within the walls 12 of the laser tube in a manner allowing it to be reliably fastened to walls 12 with a vacuum seal. A second length 18 of mirror seat 14 has an outside diameter smaller than the inside diameter of the tube formed by tube walls 12.

The second length 18 of mirror seat 14 is provided with a means for easily deforming the axis of the length of second portion of the mirror seat in order to adjust the mirror 10 which will be attached to the mirror seat. In a preferred embodiment, this means is a region 20 in second length 18 of mirror seat 14 which has a reduced wall thickness. Mirror 10 may be attached to the end of second length portion 18 of mirror seat 14 by a glass frit, solder glass or other known methods such as low temperature metallic seals shown at regions 22. The mirror seat 14 may be attached to the ends of tube walls 12 by a fusion weld such as a heliarc or TIG weld to form a vacuum seal. Weld beads 24 are shown at the end of tube 12 and mirror seat 14.

Those of ordinary skill in the art will also recognize that other means may be employed to facilitate the deforming of the second length of mirror seat 14. Such other equivalents include but are not limited to circumferential multiple ripple corrugations along the second length of mirror tube 14, as well as the use of a uniformly thin wall with either an inwardly extending or outwardly extending cross section.

Mirror seat 14 may typically be fabricated from a material which is compatible with the thermal expansion characteristics of mirror 10. For instance, if mirror 10 is made from Schott BK-7 glass, mirror seat 14 may be made of 4750 alloy available from the Special Materials Division of Allegheny Ludlum Corp. in Pittsburgh, PA, or from Carpenter Steel Division of Carpenter Technologies in Reading, PA.

A practical embodiment of mirror seat 14 may have a wall thickness of approximately .06 inches along its first length 16 which may be 0.025 inches long at a diameter compatible with the inside diameter of the laser tube into which it will be inserted, a wall thickness of approximately .08 inches along its second length 18 which may be 0.0375 inches long and a wall thickness of approximately .007 inches in its reduced wall thickness portion 20, which may be, for example, 0.1 inches in length.

In a presently-preferred embodiment, the diameter of the mirror seat along its second length is approximately half the diameter along its first length. Those of ordinary skill in the art will recognize however, that the diameter along the second length of the mirror seat may be any value allowing practical attachment of a mirror 10 and insertion of an adjusting tool, while also allowing enough freedom of movement within laser tube walls 12 for adjustment of mirror 10. Since the mirror seat of the present invention is contained wholly within the confines of the laser tube, it is protected from accidental mechanical misalignment by walls 12 of the laser tube.

Before alignment, the mirror seat material should be preannealed. This may be accomplished by raising the temperature of the mirror seat to the annealing level of the material from which it is made. If Allegheny Ludlum 4750 alloy is used, raising the temperature to approximately 800° C. for twenty to 30 minutes should be sufficient to cause annealing. The mirror seat of the present invention may also be pre-annealed in a brazing oven during a brazing cycle used for other parts. For instance, a brazing cycle in dry $H_2$ with a ramp up to between 750°–780° C., followed by a twenty minute cycle at temperature, followed by a ramp up to 800° –820° C., followed by a ten minute cycle at temperature followed by a cool down ramp, is adequate for preannealing.

Once the mirror seat has been pre-annealed and the mirror 10 has been attached to the mirror seat and the assembly has been assembled into the laser tube, the mirror 10 may be adjusted by inserting a tool oriented on axis into the end of the laser tube past the reduced wall thickness portion 20 of mirror seat 14. The tool may then be moved off axis in any direction, thus deforming the reduced wall thickness portion of the second length 18 of mirror seat. In this manner, the mirror 10 may be adjusted to the desired orientation.

Figure 2:
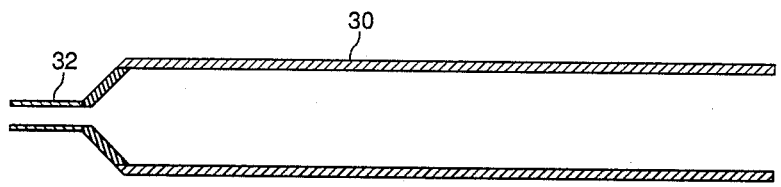
FIG. 2 is a cross sectional view of a tool useful for adjusting the protected internal laser mirror adjustment mechanism of the present invention.

FIG. 2 shows a presently-preferred embodiment of a tool suitable for use in adjusting the protected internal laser mirror adjusting apparatus of the present invention. As shown by FIG. 2, the tool may preferably be a hollow cylindrical shape 30 having a necked-down end portion 32. By providing a hollow tool, adjustment of the mirror on the output end of the laser is allowed while the laser is operating in order to determine its best operating point. Necked-down end portion 32 is preferably formed such that its outside diameter will fit closely within the inside diameter of second length 18 of mirror seat 14 without touching mirror 10. In a presently-preferred embodiment the tool may be fabricated of steel having the necked-down end portion fabricated by welding a smaller diameter tube onto the end of a larger diameter tube.

While a preferred embodiment has been specifically disclosed herein, Those of ordinary skill in the art will readily recognize that minor variations and departures from the disclosure herein are possible without departing from the spirit of the invention, which is to be limited only by the appended claims.

What is claimed is

1. A protected internal laser mirror adjustment apparatus, insertable into a laser tube, including:
   a hollow mirror seat completely insertable into the end of a laser tube, said mirror seat having a first portion of a first length and a first outside diameter closely matched with the inside diameter of said laser tube, and having a second portion of a second length and a second outside diameter smaller than said first outside diameter for attachment of a mirror,
   means in said second length, for facilitating the deformation of at least the portion of said second length of said mirror seat to which said mirror is attached, thereby adjusting said mirror off of its normal axis.

2. In a laser having a protected internal mirror adjustment apparatus, said adjustment apparatus including:
   a laser tube having a first inside diameter,
   a hollow mirror seat completely insertable into the end of a laser tube, said mirror seat having a first portion of a first length and a first outside diameter closely matched with the inside diameter of said laser tube, and having a second portion of a second length and a second outside diameter smaller than said first outside diameter for attachment of a mirror,
   means in said second length, for facilitating the deformation of at least the portion of said second length of said mirror seat to which said mirror is attached, thereby adjusting said mirror off of its normal axis.

3. A protected internal laser mirror adjustment apparatus, insertable into a laser tube, including
   a hollow mirror seat completely insertable into the end of a laser tube, said mirror seat having a first portion of a first length and a first outside diameter closely matched with the inside diameter of said laser tube, and having a second portion of a second length and a second outside diameter smaller than said first outside diameter for attachment of a mirror, a portion of said second length having a region of reduced wall thickness around its entire circumference.

4. A laser tube having a protected internal mirror adjustment apparatus, including:
   a laser tube having a first inside diameter,
   a hollow mirror seat insertable into the end of said laser tube, said mirror seat having a first portion of a first length and a first outside diameter, said first outside diameter being such that a vacuum seal may be formed between it and said laser tube, and having a second portion of a second length and a second outside diameter smaller than said first outside diameter, a portion of said second length having a region of reduced wall thickness around its entire circumference.

* * * * *